United States Patent

Rush

[15] 3,672,705
[45] June 27, 1972

[54] PIPE JACK

[72] Inventor: Harold F. Rush, Bellflower, Calif.

[73] Assignee: Garren Corporation, Huntington Beach, Calif.

[22] Filed: June 19, 1970

[21] Appl. No.: 47,815

[52] U.S. Cl.................................285/39, 285/175, 285/300, 285/330, 285/DIG. 14
[51] Int. Cl.........................................................F16l 35/00
[58] Field of Search...............285/299, 300, 301, 175, 330, 285/39, 297, 165, 226, DIG. 14, 32

[56] References Cited

UNITED STATES PATENTS

| | | | |
|---|---|---|---|
| 3,462,175 | 8/1969 | Johnson | 285/299 X |
| 3,572,776 | 3/1971 | Herd | 285/330 |
| 3,492,030 | 1/1970 | Harrison et al. | 285/300 |
| 3,451,697 | 6/1969 | Bula | 285/175 X |
| 3,476,409 | 11/1969 | Benteler et al. | 285/175 X |

Primary Examiner—Dave W. Arola
Attorney—J. Carroll Baisch

[57] ABSTRACT

A pipe jack for installation in pipe lines adjacent to a piece of equipment, such as, for example, a valve or pump, in order to remove said equipment when it needs to be serviced or replaced. End parts of the jack are threadably connected together by a center member or sleeve. The threads are left and right hand threads so that, as the center member or sleeve is rotated in one direction, the end parts are moved inwardly so that the jack contracts or is shortened and, when the sleeve is rotated in the opposite direction, the end parts are moved outwardly away from each other to lengthen the jack. Thus, a piece of equipment adjacent the jack may be removed when the jack is contracted and, when the serviced or replacement piece of equipment has been replaced, the jack is expanded to tightly and sealingly secure the piece of equipment in place. The inner ends of the end parts are provided with fingers which interlock with each other, but which are adapted to slide longitudinally relative to each other to prevent the end parts from rotating relative to each other when the jack is being shortened or lengthened. A piece of laminated, corrugated flexible tubing or sleeve is placed over the fingers and welded, or otherwise suitably secured to the end parts outwardly of the roots or outer ends of the fingers, to provide a sealing connection between the end parts.

10 Claims, 3 Drawing Figures

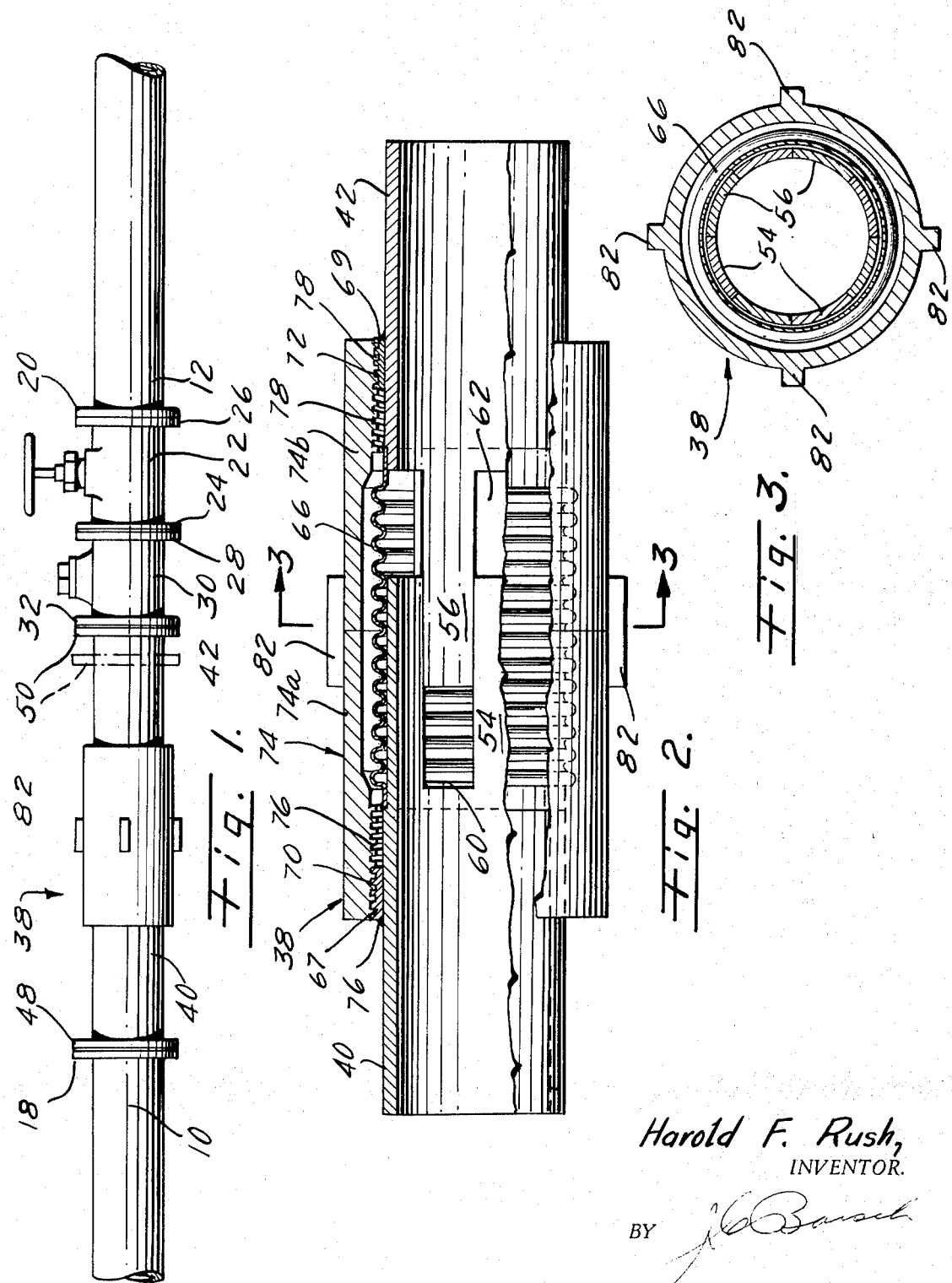

PIPE JACK

BACKGROUND OF THE INVENTION

1. Field of the Invention

This invention relates generally to close coupled piping in piping systems for fluids under pressure or vacuum, such as are found in refineries, chemical plants, flow lines and the like, and relates more particularly with means for removing pieces of equipment from such systems and for installing such pieces of equipment.

2. Description of the Prior Art

Heretofore, as far as I am aware, the piping adjacent to a piece of equipment that may require removal and re-installing of such equipment is provided with various expedients, such as a 90° angle or U-shaped portion, that must be stressed or bent sufficiently to permit removal and replacement of a piece of equipment. With this and other expedients, this operation is difficult, time consuming, costly and frequently results in physical damage to the equipment or piping.

SUMMARY OF THE INVENTION

The invention is for use as a permanent piping turnbuckle in rigid low or high pressure pipe lines, where it is sometimes necessary to shorten the piping in order to replace gaskets or to remove valves, fittings or other equipment, and comprises an expandable and retractable pipe jack having a pair of axially aligned tubular end pieces or pipe sections interconnected by respective left and right hand threads with a central connecting sleeve. From the inner ends of the end pieces there are inwardly extending, annularly spaced fingers which interlock to prevent relative rotation of said end pieces. While the fingers fit together relatively closely, the fit is loose enough to permit longitudinal sliding movement of the fingers relative to each other. There is sufficient clearance at the ends of the fingers to permit substantial longitudinal movement of the end pieces relative to each other so that the jack may be expanded and retracted.

A piece of laminated, corrugated flexible tubing is disposed over the fingers and the ends thereof and welded, brazed or otherwise suitably secured to the respective end pieces outwardly of the base of the fingers to provide a sealing connection between the end parts.

Rotation of the central connecting sleeve will cause the end pieces to move outwardly away from each other or inwardly toward each other, depending upon the direction of rotation of the central connecting sleeve, to thereby cause the jack to be increased in length or decreased in length.

The characteristics and advantages of the invention are further sufficiently referred to in connection with the following detailed description of the accompanying drawings, which represent one arrangement. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only:

FIG. 1 is a side-elevational, schematic view of a portion of a pipe line system with a jack embodying the invention installed therein and a valve in said system positioned adjacent the jack;

FIG. 2 is a longitudinal sectional view through said jack; and

FIG. 3 is a sectional view taken on line 3—3 of FIG. 2.

DESCRIPTION OF THE PREFERRED EMBODIMENT

Referring more particularly to FIG. 1, there is shown a portion of a pipe line or system including aligned pipes 10 and 12 having flanges 18 and 20 at their free ends.

There is a valve 22 having flanges 24 and 26 at the ends thereof, the flange 26 of the valve being secured to the flange 20 of the nozzle 16 by means of screws or bolts, not shown. The flange 24 at the opposite end of the valve 22 is attached to a flange 28 at one end of a check valve 30, said check valve 30 having flange 32 at its opposite end.

The pipe jack embodying the present invention is indicated generally at 38 and comprises two pieces of axially aligned pipes or tubular members 40 and 42, respectively. These pipes have respective flanges 48 and 50 at their outer free ends and, as shown in FIG. 1, the flange 50 is secured to flange 32 of the check valve 30 by means of screws or the like, not shown. The flange 48 of the pipe or tubular member 40 is secured to the flange 18 of the pipe 10 by any suitable means such as screws or the like, not shown.

The inner ends of the pipes 40 and 42 have longitudinally extending, annularly spaced interlocking fingers 54 and 56. There may be any suitable number of fingers, four for each pipe being shown. Fingers 54 and 56 are of less width than the spaces between the fingers of respective pipes 40 and 42, to permit relative sliding movement, but are close enough to hold the pipes 40 and 42 against any appreciable rotation relative to each other. The free ends of said fingers are normally spaced from the outer ends of the pipes from which the fingers of respective pipes extend, to provide spaces 60 and 62. The ends of the pipes 40 and 42 from which the fingers extend may be termed the base ends thereof.

Spanning the interlocking fingers 54 and 56 is a length of laminated, corrugated flexible expandable and contractable tubing or bellows 66, the ends of which are welded, brazed or otherwise secured to the respective pipes 40 and 42 outwardly of the base ends of said pipes. Bellows 66 provides a seal between the pipes 40 and 42 so there can be no leakage of fluid between said pipes. The bellows 66 may be of any suitable material such as, for example, stainless steel.

Adjacent the inner ends of the pipes 40 and 42 and outwardly of the adjacent ends of the bellows 66, respective pipes 40 and 42 are provided with collars 67 and 69, which are welded to said pipes, and said collars have external right and left hand threads 70 and 72, respectively.

There is a sleeve, indicated generally at 74, comprising a pair of tubular parts 74a and 74b which are installed from each end of the device after the bellows has been welded to the adjacent pipe ends, as above described. The sleeve parts are welded or otherwise suitably secured together, each part having interior threads 76 and 78 in outer end portions, which threads complement the threads 70 and 72. Any suitable type of threads may be used, if desired, but modified acme-type threads have been found to be very satisfactory and such threads are shown.

A portion of the interior of the sleeve 74 between the threaded end portions is of enlarged internal diameter to provide space 80 to accommodate the bellows 66.

Means is provided for the sleeve 74 to accommodate a tool to facilitate rotating said sleeve. For example, the sleeve is provided with a suitable number of annularly spaced external lugs 82 which may be welded or otherwise suitably secured to said sleeve. In some cases only one lug may be required. An alternative arrangement may be to flatten parts of the outside of the collar to accommodate a wrench. Rotation of the collar 74 effects contraction or extension of the device, depending on the direction of rotation.

When the jack is installed in a pipe line, as shown in FIG. 1 for example, it is in its extended position. The free ends of the fingers are then spaced from the adjacent base ends of the pipes and the bellows is in a relaxed condition, which is normal for operation of the pipe line.

When a pipe line is made up there should be a jack 38 adjacent all pieces of equipment in the line that may require removal for any reason. For example, in FIG. 1, which illustrates an example of such an installation, should it be necessary to remove either the check valve 30 or the valve 22, pressure in that part of the line is cut off and the sleeve 74 is rotated in a direction to effect contraction or shortening of the jack, that is to effect a reduction of the length of the jack. The piece of equipment, valve 30 and/or valve 22 may then be easily removed. These pieces of equipment may be serviced or repaired for replacement in the pipe line or new ones installed.

When re-installing the piece of equipment it is placed back in the pipe line with suitable gaskets or the like and the collar 74 of the jack rotated in the opposite direction to effect lengthening of said jack to thereby effectively seal the piece or pieces of equipment in the line so that the pipe line becomes effectively a solid pipe line again.

In effecting removal and reinstallation or installation of pieces of equipment in such a pipe line, there is no necessity to preload or place under stress any part or parts of the pipe line or any of its joints since the piping assembly is originally made up with the normal position of the jack in its extended position.

The force required to actuate the sleeve 74 is not great because of the acme-type of threads so that one man can operate the device. Actuation of the device can be effected either manually or by power means of any well-known character. Also, the device can be operated remotely, if desired. The power means may be electrical, hydraulic, pneumatic or the like.

The internal diameter of the pipes or tubular member 40 and 42 is substantially the same as the internal diameter of the adjacent piping or parts of the pipe line to which the jack is connected, so there is no restriction in the flow of fluids through the jack. In fact, scraper pigs or other fluid-moved tools can pass through the jack with no possible interference with the movement of the pig or other fluid-moved tools.

It is to be understood that the invention cannot only be used in piping or pipe lines of refineries, chemical plants and the like but can also be used in subsea and subsurface lines. It can also be used in water pollution treating plants. Other uses may be in pipe lines carrying oil from offshore oil wells, that is in subsea pipe lines. The pipe lines may also be subsurface lines.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. A pipe jack, comprising:
   A. a pair of axially-aligned tubular members;
   B. a plurality of annularly-spaced fingers on the inner ends of said tubular members, said fingers being longitudinally slidable relative to each other but restraining said tubular members against relative rotation;
   C. longitudinally contractible and expandable sealing means operably interconnecting the inner ends of said tubular members;
   D. respective right and left hand threads formed on cylindrical portions on said tubular members;
   E. and a sleeve on said tubular members, said sleeve having internal threads formed on a cylindrical inner surface in end portions thereof, said threads complementing respective threads on said tubular members so that rotation of said sleeve will effect longitudinal movement of said tubular members for lengthening and shortening said jack, depending on the direction or rotation of said sleeve.

2. The invention defined by claim 1, wherein the threads on said tubular members and in said sleeve are acme-type threads.

3. The invention defined by claim 1, wherein the sealing means comprises a contractible and ans expandable bellows.

4. The invention defined by claim 1, wherein the sleeve has an enlarged diameter portion intermediate the ends thereof, for accommodating said bellows and limiting radial expansion thereof.

5. The invention defined by claim 1, wherein said tubular members have means at their outer ends for connecting same to adjacent parts of a pipe line.

6. The invention defined by claim 1, wherein the sleeve has external means for engagement by a tool for rotating said collar.

7. The invention defined by claim 6, wherein said external means comprises at least one lug on the outside of said sleeve.

8. The invention defined by claim 1, including end members secured to the ends of the tubular members.

9. The invention defined by claim 2, wherein said sealing means comprises a contractible and expandable bellows; the sleeve has an interior space for accommodation of said bellows; means at the ends of said tubular members for connecting same to adjacent parts of a pipe line; and said sleeve has means for attachment of a tool for rotating said sleeve.

10. The invention defined by claim 9, wherein the means for said sleeve for attachment of a tool comprises at least one annularly-spaced lug on the exterior of said sleeve.

* * * * *